United States Patent
Sato

(10) Patent No.: US 8,726,928 B2
(45) Date of Patent: May 20, 2014

(54) UNIT FOR BORING WITHOUT STOPPING PASSAGE OF FLUID

(75) Inventor: Toshiyuki Sato, Shiga (JP)

(73) Assignee: Suiken Co., Ltd., Shiga (JP)

( * ) Notice: Subject to any disclaimer, the term of this patent is extended or adjusted under 35 U.S.C. 154(b) by 0 days.

(21) Appl. No.: 13/494,086

(22) Filed: Jun. 12, 2012

(65) Prior Publication Data

US 2013/0000749 A1   Jan. 3, 2013

(51) Int. Cl.
  *B23B 41/08* (2006.01)
  *F16L 55/10* (2006.01)
  *F16K 31/44* (2006.01)

(52) U.S. Cl.
  USPC ........ 137/318; 137/15.14; 138/94; 251/249.5

(58) Field of Classification Search
  USPC ........ 137/317, 318, 319, 15.08, 15.09, 15.12, 137/15.13, 15.14; 138/94, 94.3, 97; 251/249.5, 901
  See application file for complete search history.

(56) References Cited

U.S. PATENT DOCUMENTS

| | | | |
|---|---|---|---|
| 3,948,282 A | 4/1976 | Yano | |
| 6,776,184 B1 * | 8/2004 | Maichel et al. | 137/318 |
| 8,402,992 B2 * | 3/2013 | Yamashita et al. | 137/318 |
| 2009/0065070 A1 | 3/2009 | Jaehyun et al. | |

FOREIGN PATENT DOCUMENTS

| | | |
|---|---|---|
| JP | 48-102317 | 12/1973 |
| JP | 01-105091 A | 4/1989 |
| JP | 06-074387 A | 3/1994 |
| JP | 09-144912 A | 6/1997 |
| JP | 2002-321109 A | 11/2002 |
| JP | 2006-207747 A | 8/2006 |
| JP | 2008-190568 A | 8/2008 |
| WO | WO 2008/155943 A1 | 12/2008 |
| WO | 2010/050115 A1 | 5/2010 |

* cited by examiner

*Primary Examiner* — John Rivell
*Assistant Examiner* — Kevin Barss
(74) *Attorney, Agent, or Firm* — Renner, Otto, Boisselle & Sklar, LLP

(57) ABSTRACT

An apparatus including: a sealing case including separate cases and enclosing a portion of an existing pipe, and a valve cover portion attached to a branch pipe portion protruding upwardly from the existing pipe; a gate valve body accommodated by the valve cover portion and the branch pipe portion to be intruded into the existing pipe to stop the flow of the fluid through the existing pipe; an operation valve body having an arc-shaped lateral cross section for opening/closing a branch hole formed in the branch pipe portion by rotating in the circumferential direction of the existing pipe; and a rotation mechanism for rotating the operation valve body, the rotation mechanism including: an operation portion; a driving gear unit which rotates; and a driven gear for rotating the operation valve body in the circumferential direction of the existing pipe following the rotation of the driving gear unit.

3 Claims, 14 Drawing Sheets

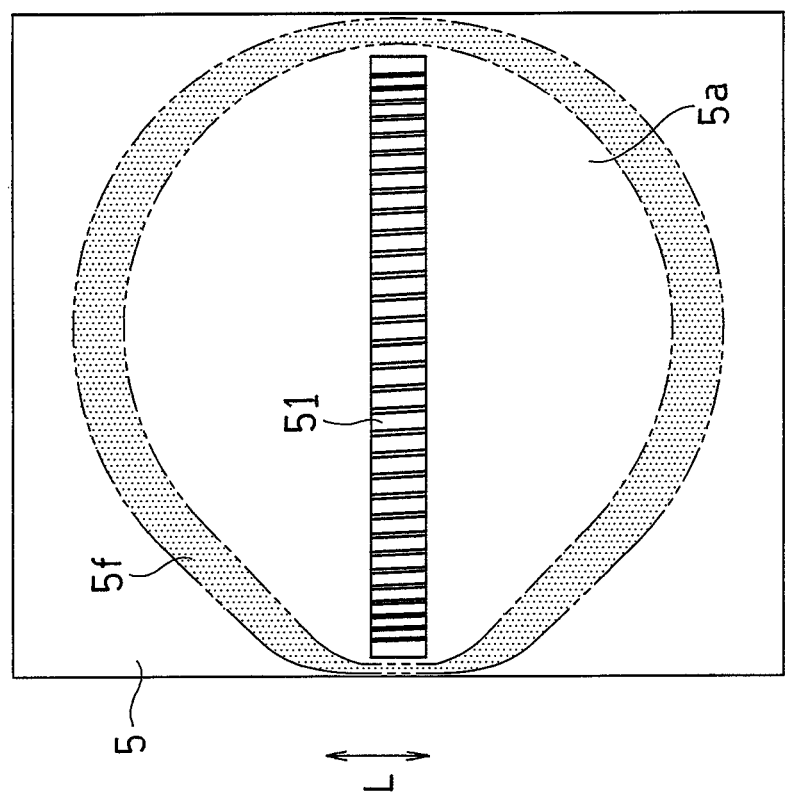

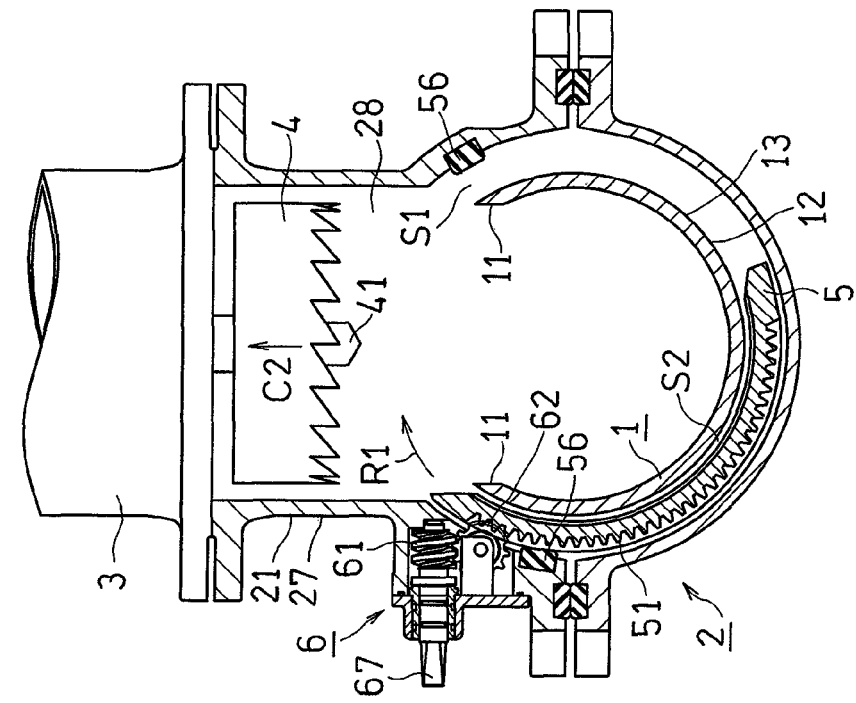
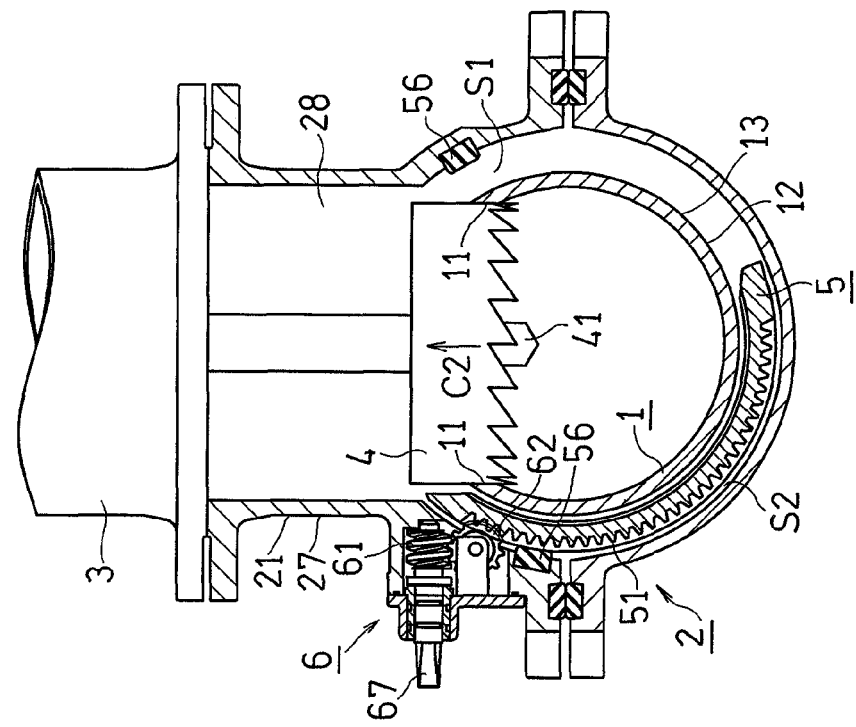

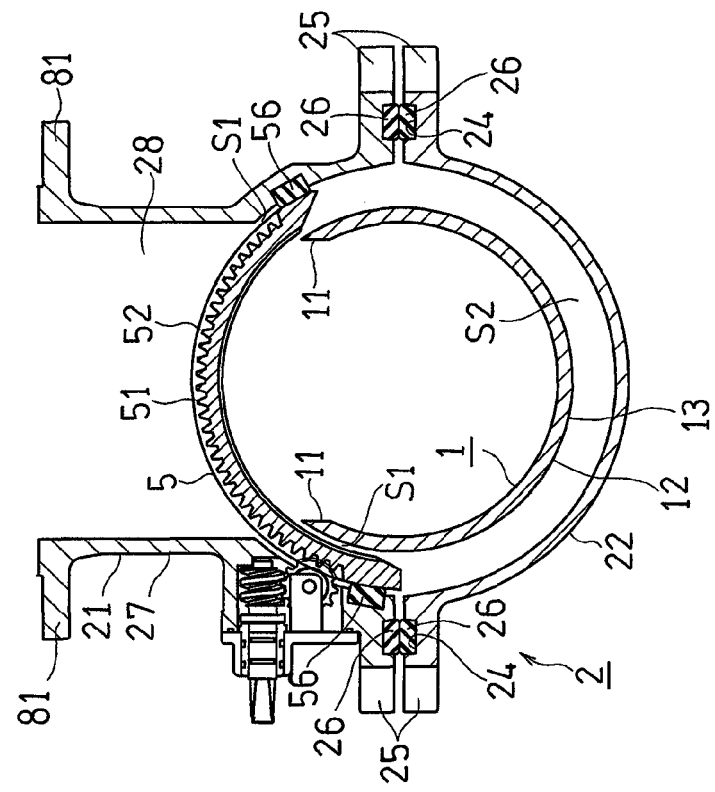
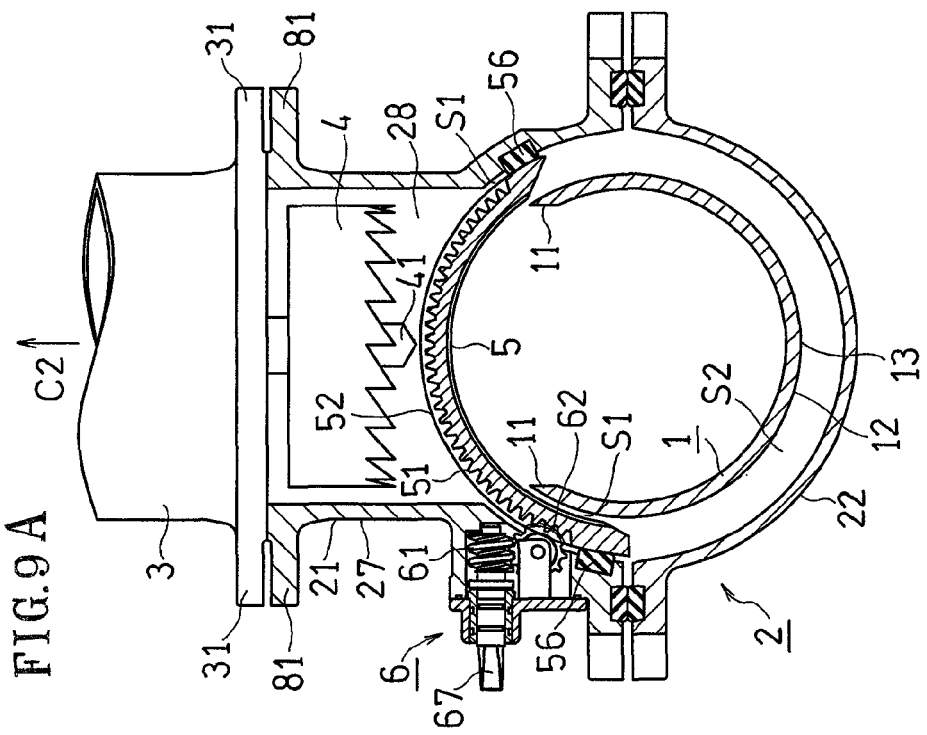

UNIT FOR BORING WITHOUT STOPPING PASSAGE OF FLUID

TECHNICAL FIELD

The present invention relates to an apparatus for flow-undisrupted boring.

BACKGROUND ART

There are conventional processes well known in the art, in which an opening is formed to insert a gate valve body into the line of an existing pipe, without disrupting the flow of a fluid through the existing pipe (see the first patent document).

CITATION LIST

Patent Literature

[FIRST PATENT DOCUMENT] Japanese Laid-Open Patent Publication No. 48-102317 (FIGS. 1-4)

The operation procedure, etc., disclosed in the first patent document will be described briefly.

First, as shown in FIG. 13A, a portion of an existing pipe 1 is covered by a separate case 221. An operation valve 100 is provided in the separate case 221. Then, as shown in FIG. 13B, a boring machine 3 is connected to the operation valve 100.

In this state, the boring machine 3 is operated so as to bore a circular opening 11 in the existing pipe 1 with a hole saw 4 at the tip by spinning the main shaft.

Then, after the hole saw 4 is retracted, the valve body 100 is closed, as shown in FIG. 13C, after which the boring machine 3 is detached.

Then, as shown in FIG. 13D, a gate valve installment unit 102 is attached to the operation valve 100. A gate valve body 101 and a gate valve cover 103 are accommodated in the gate valve installment unit 102.

After the operation valve 100 is opened, the valve cover 103 and the gate valve body 101 in the gate valve installment unit 102 are lowered, as shown in FIG. 14A, and the valve cover 103 and the separate case 221 are secured to each other. Then, the gate valve body 101 is lowered and the valve is closed, thereby stopping the flow of a fluid through the existing pipe 1 on the downstream side. In such a state, an operation is performed, e.g., repairing the pipe on the downstream side.

After the operation is completed, the gate valve body 101 is pulled up in the upward direction, as shown in FIG. 14B, so as to allow the fluid to flow through the existing pipe 1.

SUMMARY OF THE INVENTION

Now, in a water main operation, or the like, a water stop operation on the inside of an existing pipe may be completed in a single operation.

However, the first patent document fails to disclose a method for removing the gate valve body, and after the operation downstream, the valve cover accommodating the gate valve body therein will be left attached to the existing pipe. Thus, the operation will be completed with a water stop valve attached unnecessarily. Since the water stop valve used in the operation cannot be detached and reused in another operation, it is necessary to provide a gate valve body for each water stop operation, preventing cost reduction.

Therefore, a main object of the present invention is to provide an apparatus for flow-undisrupted boring suitable for inserting a gate valve body for stopping the flow of a fluid through an existing pipe and removing the inserted gate valve body. Another object of the present invention is to provide an apparatus for flow-undisrupted boring with which insertion and removal of a gate valve body can be done in a simple manner.

In order to achieve the objects set forth above, an apparatus of the present invention is an apparatus for flow-undisrupted boring suitable for boring a portion of a pipe wall of an existing pipe to form an opening in the pipe wall with a boring machine, inserting a gate valve body into a line of the existing pipe to stop a flow of a fluid through the existing pipe, and removing the inserted gate valve body, the apparatus including: a sealing case including first and second separate cases separated from each other in a circumferential direction of the existing pipe and enclosing a portion of the existing pipe, and a valve cover portion attached to a branch pipe portion formed integral with the first separate case and protruding upwardly in a radial direction of the existing pipe; a gate valve body accommodated by the valve cover portion and the branch pipe portion to be intruded into the existing pipe to stop the flow of the fluid through the existing pipe; an operation valve body including a portion having an arc-shaped lateral cross section for opening/closing a branch hole formed in the branch pipe portion by rotating in the circumferential direction of the existing pipe between an inner periphery surface of the sealing case and an outer periphery surface of the existing pipe; a valve seat provided on the inner periphery surface of the first separate case with which the operation valve body contacts in a valve-closed state; and a rotation mechanism for rotating the operation valve body, the rotation mechanism including: an operation portion rotated outside the sealing case; a driving gear unit which rotates following the rotation of the operation portion; and a driven gear provided on the operation valve body for rotating the operation valve body in the circumferential direction of the existing pipe following the rotation of the driving gear unit.

According to the present invention, it is possible to bore a portion of a pipe wall of an existing pipe to form an opening in a flow-undisrupted manner, and to insert a gate valve body into the existing pipe through the opening to stop the flow of the line, allowing for operations downstream. After the operations, the gate valve body is pulled up from inside the existing pipe into the branch pipe portion, thereby allowing water flow.

Particularly, in this state, it is possible to close the operation valve body and to remove the gate valve body.

Thus, the removed gate valve body can be reused in other operations.

Since the portion of the operation valve body having an arc-shaped lateral cross section rotates along the existing pipe in the gap between the sealing case and the existing pipe, it is not necessary to separately provide a portion for accommodating the operation valve body such as a valve housing or a valve cover. Therefore, the apparatus is inexpensive and small.

Moreover, an arc-shaped valve body has a greater flexural strength than a flat plate-shaped operation valve body. Therefore, the operation valve body can be made thinner.

It is not necessary to separately provide a portion for accommodating the operation valve body, and therefore the boring stroke is shorter.

On the other hand, where the flow of the fluid through the existing pipe is stopped using the gate valve body, it is not necessary to separately provide a portion for accommodating the operation valve body, thereby shortening the stroke by which the gate valve body is moved up and down.

Since the operation valve body remains as it is in the pipeline, it is not necessary to use a valve installment unit, making the operation of removing the gate valve body very simple.

In a preferred embodiment of the present invention, the apparatus is such that: a gear case portion is formed integral with the first separate case, the gear case portion having an inner opening which opens in a horizontal first direction toward the existing pipe, allowing for a portion of the driving gear unit to mesh with the driven gear, and an outer opening which opens in a second direction opposite to the first direction, wherein the gear case portion forms a depressed portion accommodating a portion of the driving gear unit, and allows the driving gear unit to be inserted and assembled through the outer opening; a cover which shuts the outer opening of the gear case portion is fastened to the gear case portion; the operation portion protrudes in the second direction through a through hole horizontally running through the cover; and the cover can be removed from the gear case portion so as to allow the driving gear unit to be taken out from the gear case portion through the outer opening.

According to this embodiment, with the provision of the gear case portion forming the depressed portion, it is possible to assemble the apparatus by inserting the driving gear unit through the outer opening of the gear case portion and shutting the gear case portion with the cover. Thus, it is no longer necessary, in assembly, to insert the driving gear unit from the reverse surface side of the heavy separate case. That is, it is possible to install the driving gear unit through the outer opening. This makes the apparatus assembly operation significantly easier.

In a preferred embodiment of the present invention, the driving gear unit includes a worm which rotates integral with the operation portion, and a worm wheel which rotates following the rotation of the worm.

Here, if the operation valve body moves in the circumferential direction during the installment operation, the working efficiency of the installment decreases. There are vibrations from vehicles passing on the road surface after the completion of the boring operation, and if the operation valve body moves in the circumferential direction due to these vibrations, the branch hole may shut inadvertently.

According to this embodiment, the operation valve body does not move inadvertently by using a pair of gears including an irreversible worm and a worm wheel.

In a preferred embodiment of the present invention, a bearing portion rotatably supporting the worm wheel is formed integral with the cover.

According to this embodiment, by attaching the worm wheel to the bearing portion which is formed in advance in the cover, it is possible to attach the cover and install the worm wheel simultaneously, thus significantly improving the working efficiency during assembly. Moreover, it is no longer necessary to separately provide a support member, or the like, for rotatably supporting the worm wheel, thereby simplifying the structure.

BRIEF DESCRIPTION OF THE DRAWINGS

FIG. 6 is a schematic side view showing an operation valve body.

FIGS. 8A and 8B are schematic cross-sectional views of the apparatus, etc., showing the flow-undisrupted boring method.

FIGS. 9A and 9B are schematic cross-sectional views of the apparatus, etc., showing the flow-undisrupted boring method.

DESCRIPTION OF EMBODIMENTS

Figure 1:
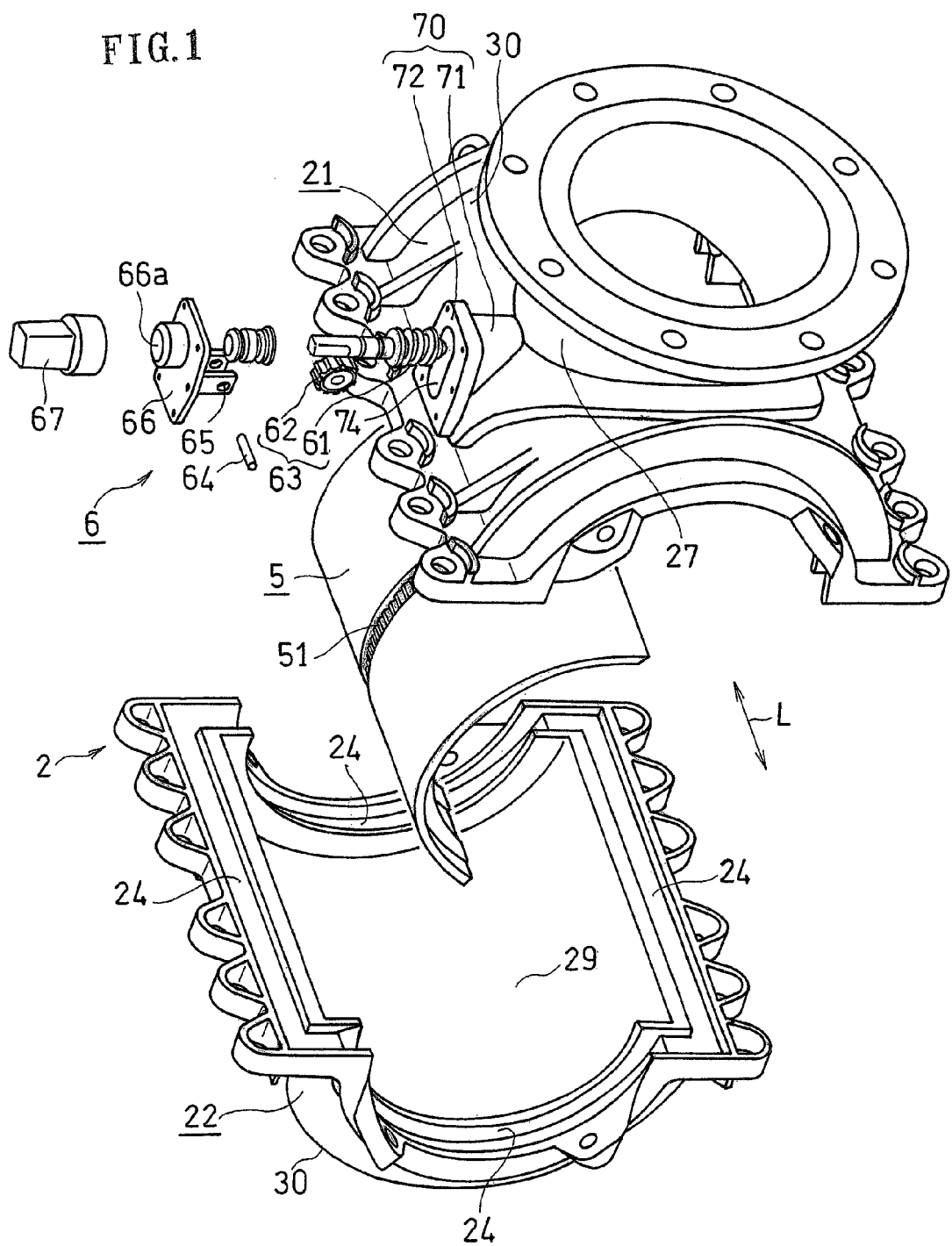
FIG. 1 is an exploded perspective view showing an apparatus for flow-undisrupted boring according to one embodiment of the present invention.

The present invention will be understood more clearly from the following description of preferred embodiments taken in conjunction with the accompanying documents. However, the embodiments and the drawings are merely illustrative, and shall not be relied upon in defining the scope of the present invention. The scope of the present invention shall be defined only by the appended claims. In the accompanying drawings, like reference numerals denote like components throughout the plurality of figures.

Embodiments of the present invention will now be described with reference to the drawings.

Embodiment 1:

First, the general configuration of the present apparatus will be described.

Figure 2:
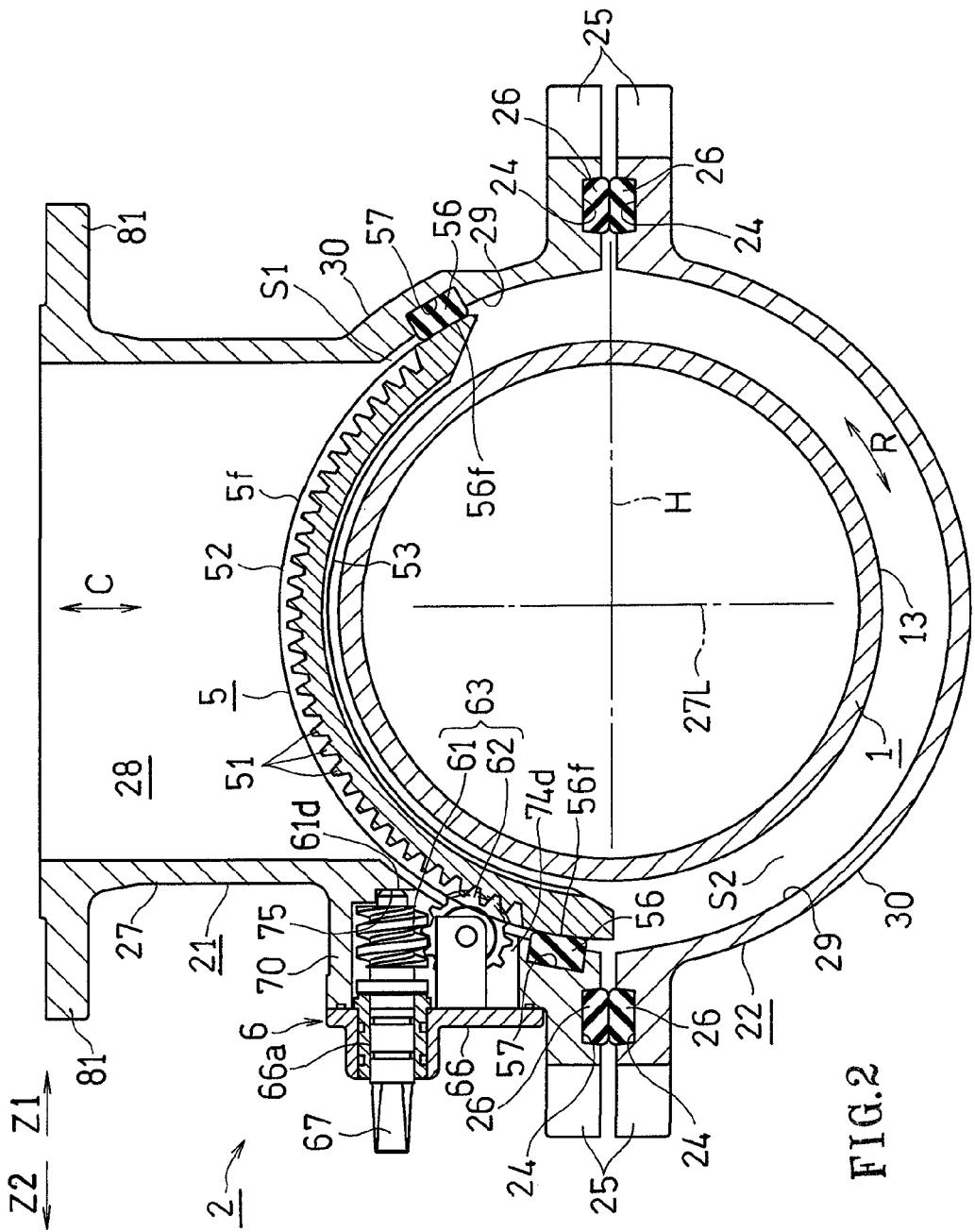
FIG. 2 is a schematic cross-sectional view showing the apparatus.

Apparatus for Flow-Undisrupted Boring 2 (Unit for Boring Without Stopping Passage of Fluid):

The present apparatus 2 shown in FIGS. 1 and 2 is used for enclosing an existing pipe 1 while a fluid (e.g., water, etc.) is flowing through the inside of the existing pipe 1, for flow-undisrupted boring or for inserting/removing a gate valve body, etc.

Figure 10:
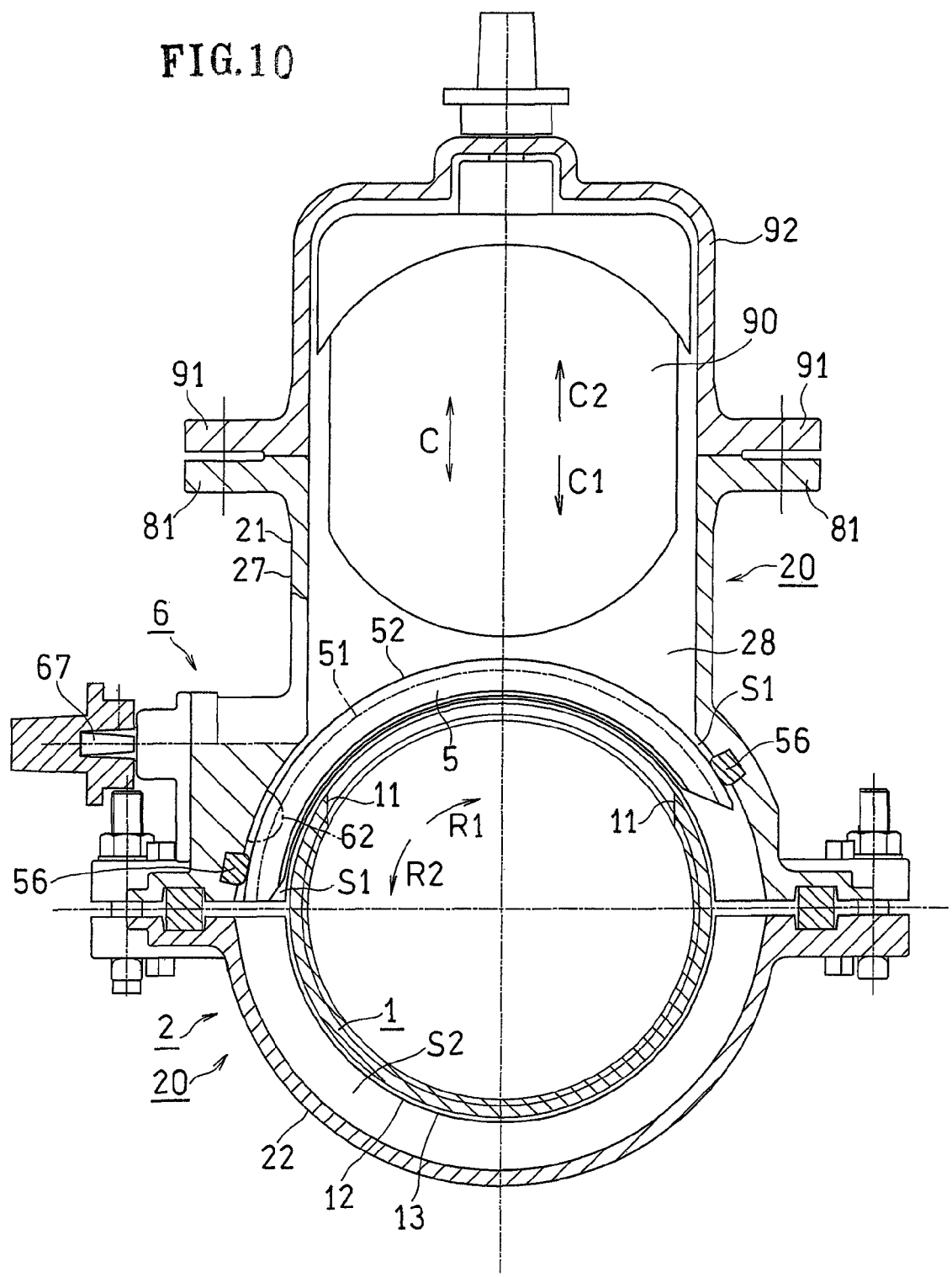
FIG. 10 is a schematic cross-sectional view showing the apparatus, etc., with a gate valve body attached thereto.

That is, the present apparatus 2 is for boring a portion of a pipe wall 12 of the existing pipe 1 with a boring machine 3 having a hole saw 4, as shown in FIG. 8A, and also for inserting a gate valve body 90 into the existing pipe 1 to stop water in the existing pipe 1 and removing the gate valve body 90, as shown in FIG. 10.

As shown in FIG. 2, a sealing case 20 of the present apparatus 2 includes first and second separate cases 21 and 22 which are separated from each other in the circumferential direction R of the existing pipe 1. A branch pipe portion 27 to be branching off of the existing pipe 1 by protruding in a radial direction C of the existing pipe 1 is formed integral with the first separate case 21.

Separate Cases 21 and 22:

The first and second separate cases 21 and 22 are separated from each other along a virtual plane H which is generally orthogonal to an axis 27L of the branch pipe portion 27. The pair of separate cases 21 and 22 is attached to the existing pipe 1 from outside in the up-down direction of the radial direction C of the existing pipe 1 and are assembled together by fastening coupling portions 25 thereof to each other by assembling bolts (not shown).

Figure 5:
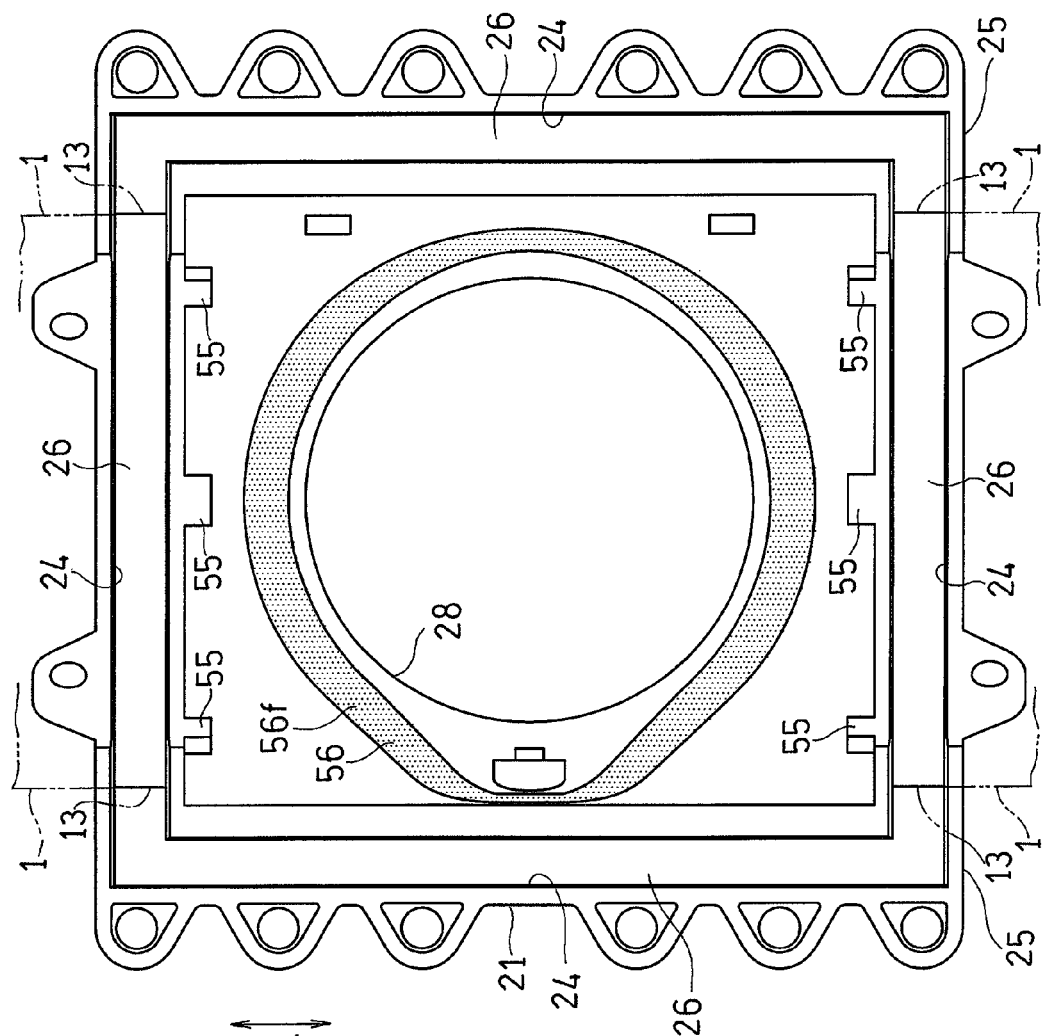
FIG. 5 is a schematic side view showing the first separate case.

As shown in FIGS. 1 and 2, the separate cases 21 and 22 each have an inner periphery surface 29 which is curved generally along an outer periphery surface 13 of the existing pipe 1. As shown in FIGS. 1, 2 and 5, groove-shaped packing attachment portions 24 are formed along the coupling portions 25 and opposite end portions of an inner periphery surface 29 in a pipe axis direction L of the existing pipe 1 of the separate cases 21 and 22. Rubber packings 26 are attached to the packing attachment portions 24, thereby sealing between the existing pipe 1 and the sealing case 20 and between the first separate case 21 and the second separate case 22.

Note that bolt insertion holes (not shown) may be further provided in the opposite end portions of the separate cases 21 and 22 in the pipe axis direction L, and the opposite end portions may be fastened together by assembling bolts.

Branch Pipe Portion 27:

As shown in FIGS. 7A, 9, 10, and 11 the boring machine 3, a valve cover portion 92 and a valve plate 95 are attached to a joint portion 81, which is like a plate-shaped flange, for example, of a branch pipe portion 27.

Figure 7A:
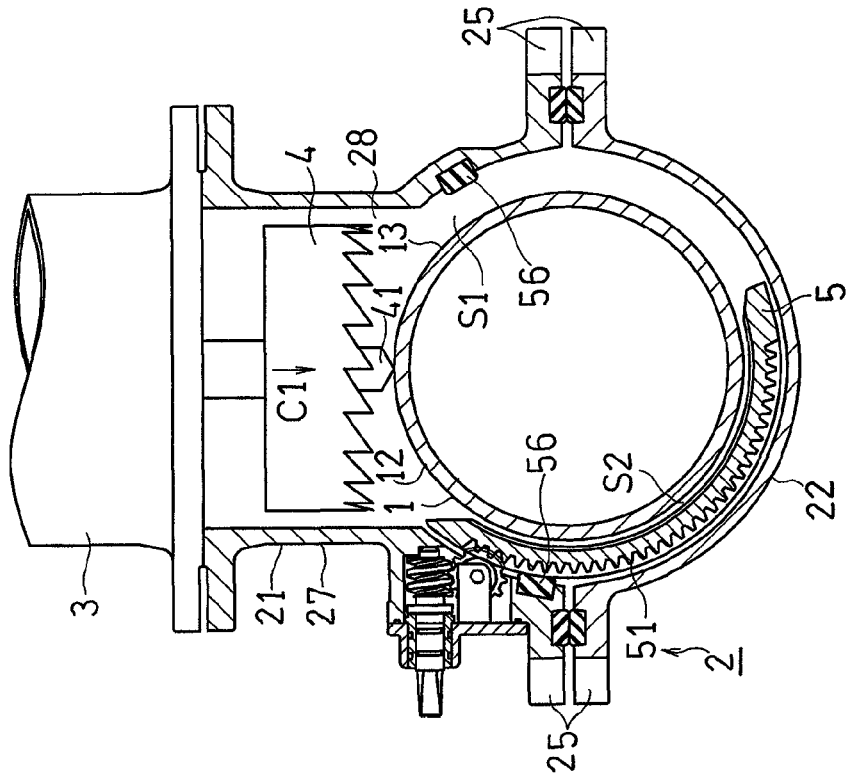
FIGS. 7A and 7B are schematic cross-sectional views of the apparatus, etc., showing a flow-undisrupted boring method.
Figure 7B:
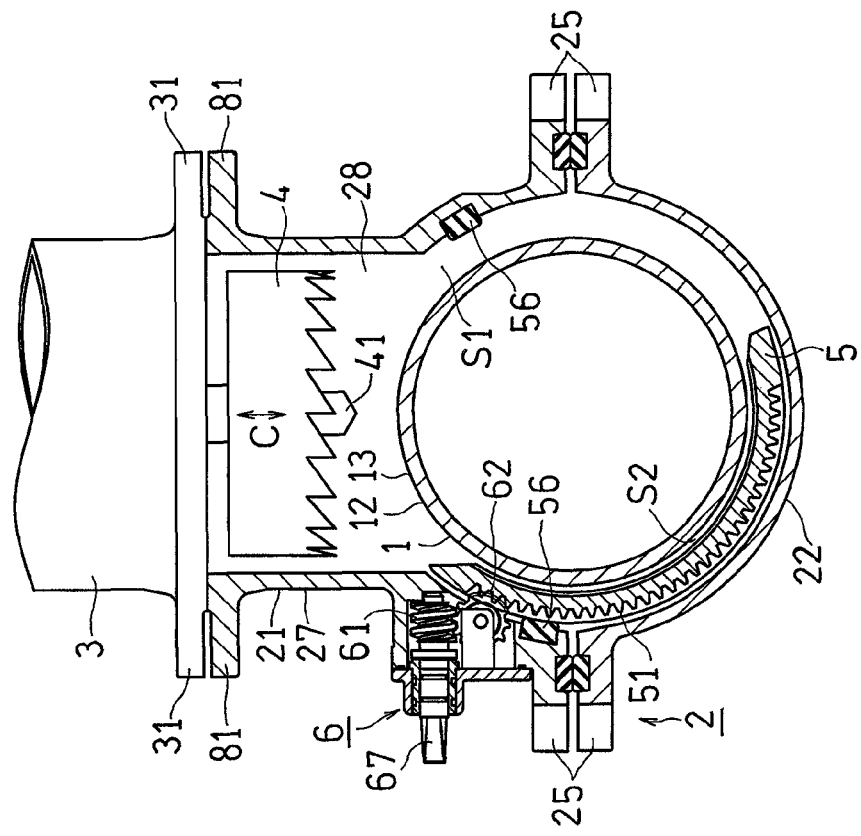

For example, in order to bore the existing pipe 1, the hole saw 4 shown in FIG. 7A, while spinning, is passed toward the radial direction C of the existing pipe 1 through a branch hole 28 of the branch pipe portion 27, the pipe wall 12 of the existing pipe 1 is cut as shown in FIG. 8A, thereby boring the opening 11 in the existing pipe 1 as shown in FIG. 8B. Note that a center drill 41 for positioning the hole saw 4 is provided at the center of rotation of the hole saw 4 so as to protrude toward the existing pipe 1, as shown in FIG. 7B.

Operation Valve Body 5:

As shown in FIG. 2, first and second spaces S1 and S2 are provided between the existing pipe 1 and the first and second separate cases 21 and 22, respectively. The first space S1 and the second space S2 communicate with each other in the circumferential direction R, and accommodate an operation valve body 5 which has an arc-shaped lateral cross section so that the operation valve body 5 can be moved between the two separate cases 21 and 22. The operation valve body 5 opens/closes the branch hole 28 of the branch pipe portion 27 by rotating along the inner periphery surfaces 29 of the separate cases 21 and 22 and the outer periphery surface 13 of the existing pipe 1 and in the circumferential direction R of the existing pipe 1.

That is, the majority of the operation valve body 5 is accommodated in the second space S2 in the valve-open state of FIG. 7A and the boring state of FIG. 8A, whereas the majority of the operation valve body 5 is accommodated in the first space S1, thus shutting the branch hole 28, in the valve-closed state of FIGS. 9A and 9B after being rotated by a rotation mechanism 6.

A guide portion 55 (see FIG. 5) for guiding the rotation of the arc-shaped operation valve body 5 is provided integral with the separate cases 21 and 22.

By rotating the operation valve body 5 in the circumferential direction R of the existing pipe 1, it is possible to rotationally move the operation valve body 5 between the valve-open position shown in FIG. 7A and the valve-closed position shown in FIG. 9A.

A sealing rubber ring (an example of the valve seat) 56 is attached, in a generally circumferential pattern, to a rubber ring attachment groove 57 in the first separate case 21 having the branch pipe portion 27 shown in FIG. 2 along the perimeter around the branch hole 28 of the branch pipe portion 27 and a gear case portion 70 thereof to be described later.

As the operation valve body 5 is rotationally moved to the valve-closed position shown in FIG. 9A, a first contact portion 5f indicated by a dotted area in the operation valve body 5 of FIG. 6 comes into close contact with a second contact portion 56f of the rubber ring 56 indicated by a dotted area of FIG. 5. This shuts the branch hole 28, as shown in FIG. 9A, thus sealing the space around the opening 11 of the existing pipe 1 with the separate cases 21 and 22 and the operation valve body 5.

Note that through holes (not shown) are formed in opposite end portions of the operation valve body 5 shown in FIG. 6. The provision of the through holes in the operation valve body 5 allows for powder coating while hanging the operation valve body 5 with hooks through the through holes, and also reduces the weight of the operation valve body 5.

Next, important parts of the present invention will be described in greater detail.

Rotation Mechanism 6:

The rotation mechanism 6 for rotating the operation valve body 5 is provided in the first separate case 21 shown in FIG. 2.

The rotation mechanism 6 includes an operation portion 67 rotated outside the first separate case 21, a driving gear unit 63 which rotates following the rotation of the operation portion 67, and a driven gear 51 provided on the operation valve body 5 for rotating the operation valve body 5 along the circumferential direction R of the existing pipe 1 following the rotation of the driving gear unit 63.

The driving gear unit 63 includes a worm 61 which rotates integral with the operation portion 67, and a worm wheel 62 which rotates following the rotation of the worm 61. The worm 61 and the worm wheel 62 mesh with each other, and the driven gear 51 meshes with the worm wheel 62. Note that the axial direction of the worm 61 is set to the horizontal direction.

On the other hand, as shown in FIG. 6, the driven gear 51 is provided generally at the center of the operation valve body 5 in the pipe axis direction L. As shown in FIG. 2, the worm wheel 62 protrudes from a depressed portion 73 (FIG. 3) to be described later into the first space S1. The driven gear 51 meshes with the worm wheel 62, and rotates in the circumferential direction R following the rotation of the worm wheel 62, thereby rotating the operation valve body 5.

That is, when an operator rotates the operation portion 67, the driven gear 51 is rotated via the worm 61 and the worm wheel 62, thereby rotating the operation valve body 5.

Therefore, the operation portion 67, the driving gear unit 63 (the worm 61, the worm wheel 62) and the driven gear 51 together form the rotation mechanism 6 for rotating the operation valve body 5.

Figure 3:
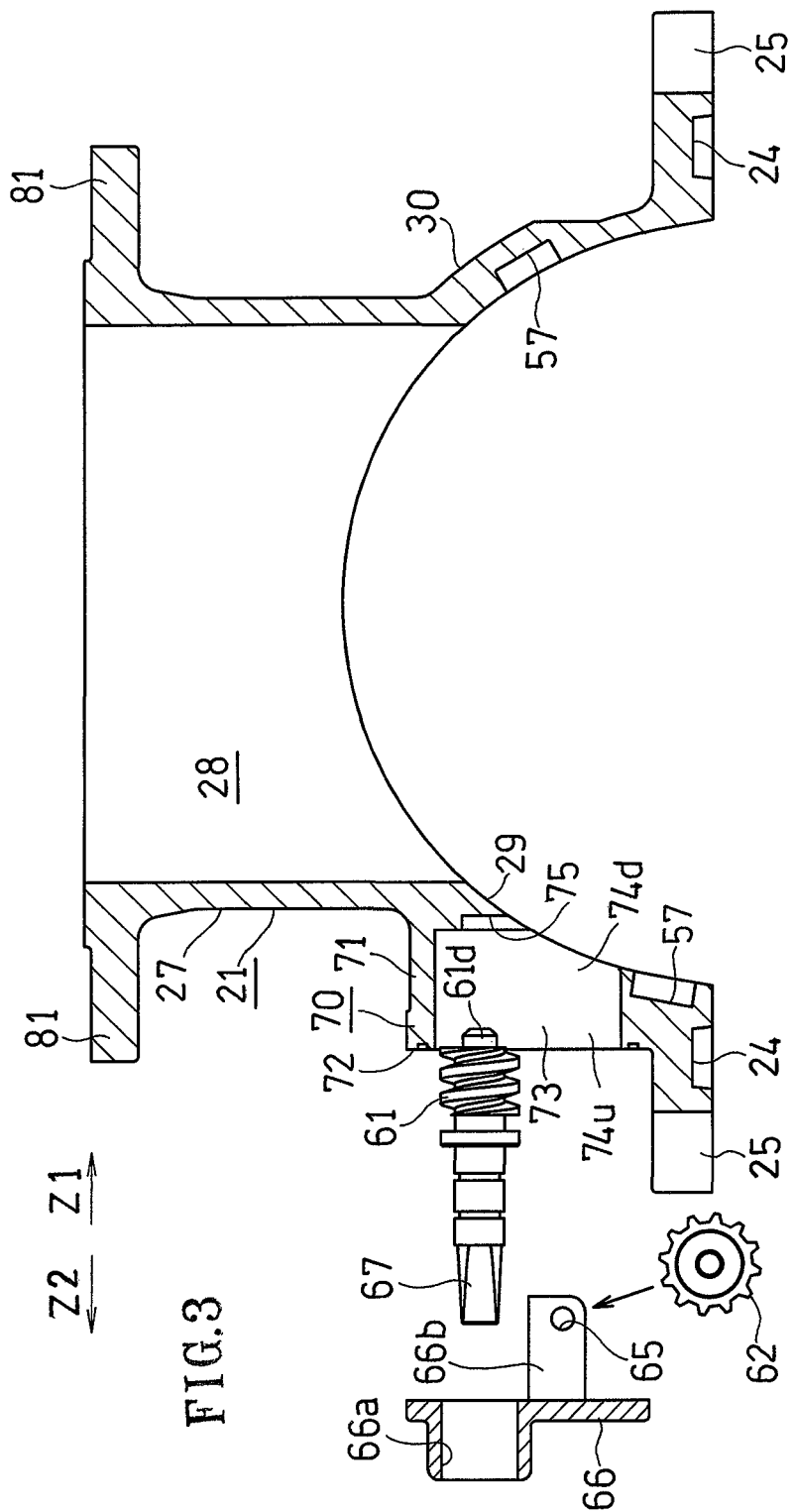
FIG. 3 is an exploded schematic cross-sectional view showing a first separate case.

Gear Case Portion 70:

The gear case portion 70 is formed integral with the first separate case 21 in the first separate case 21. As shown in FIG. 3, the gear case portion 70 has an inner opening 74d which opens in the horizontal first direction Z1, allowing for the worm wheel 62 to mesh with the driven gear 51, and an outer opening 74u which opens in the second direction Z2 opposite to the first direction Z1. The gear case portion 70 forms the depressed portion 73 accommodating a portion of the driving gear unit 63. The driving gear unit 63 can be inserted and assembled through the outer opening 74u.

As shown in FIGS. 1 and 2, the first and second separate cases 21 and 22 each have a curved surface portion 30 extending along the existing pipe 1. As shown in FIG. 1, the gear case portion 70 includes a side wall 71 extending in the horizontal direction from the curved surface portion 30 of the first separate case 21, and a flange 72 which is formed integral with an end portion of the side wall 71 in the second direction Z2 and to which a cover 66 is fastened.

Therefore, the cover 66 is fastened to the gear case portion 70 by bolts (not shown) via the flange 72, thereby shutting the outer opening 74u of the gear case portion 70. Note that a rubber packing (not shown) is interposed between the cover 66 and the flange 72.

Attachment of Driving Gear Unit 63 to Cover 66:

As shown in FIG. 3, the operation portion 67 is formed integral with an end portion of the worm 61 in the second direction Z2.

Figure 4:
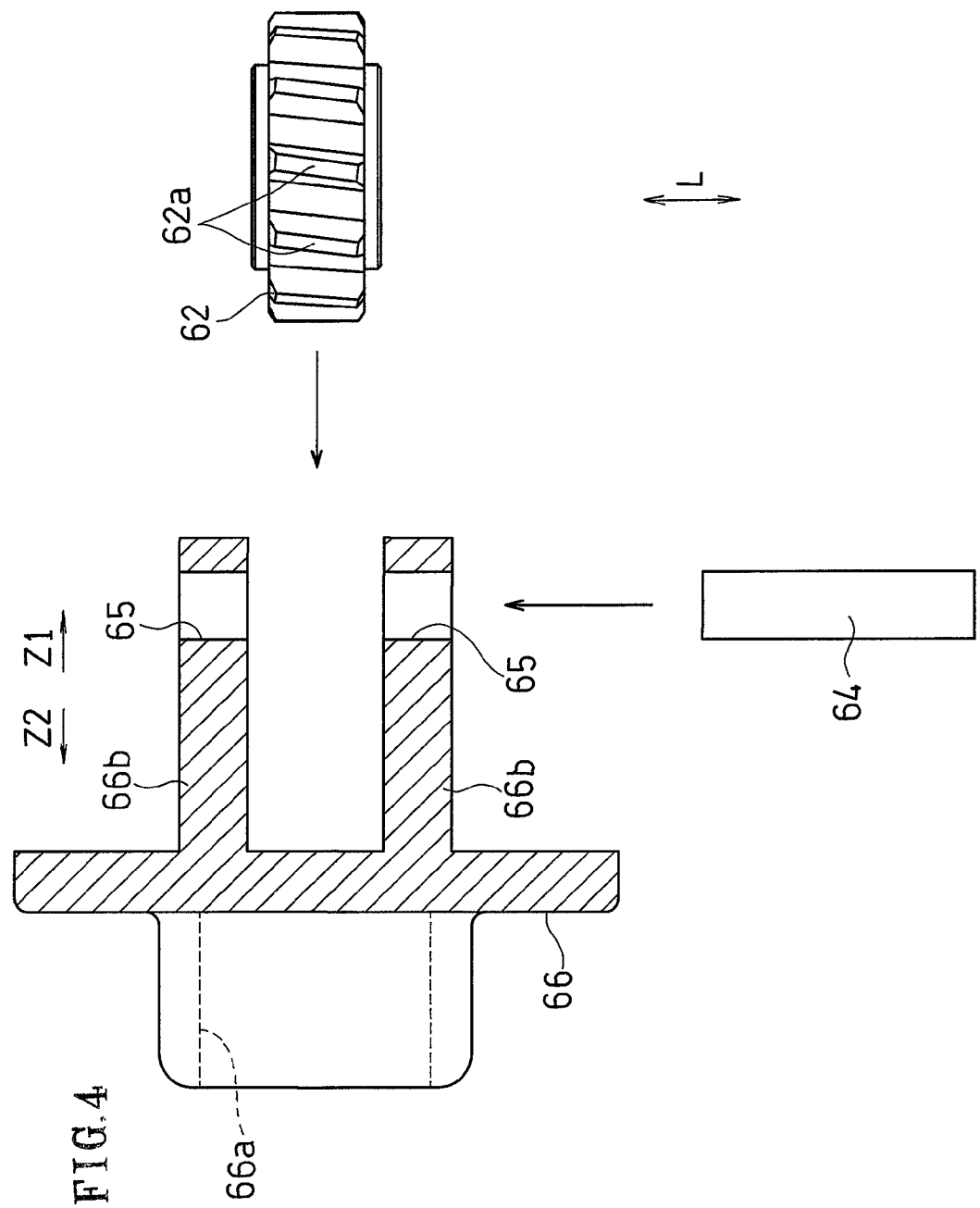
FIG. 4 is an exploded schematic side view showing how a worm wheel is attached to a cover.

On the other hand, as shown in FIG. 4, a support portion 66b is formed integral with an end portion of the cover 66 in the first direction Z1, and a bearing portion (hole) 65 is formed in the support portion 66b. A rotation shaft 64 for rotatably supporting the worm wheel 62 is inserted through the bearing portion 65.

With the rotation shaft 64 inserted through the worm wheel 62 and the bearing portion 65, the worm wheel 62 is rotatably attached to the cover 66, as shown in FIG. 2.

On the other hand, a through hole 66a running in the horizontal direction through the cover 66 is formed in the cover 66 shown in FIG. 3. The worm 61 is rotatably attached to the through hole 66a of the cover 66 so as to mesh with the worm wheel 62, as shown in FIG. 2. With the worm 61 attached to the cover 66, the operation portion 67 formed in an end portion of the worm 61 in the first direction Z1 protrudes in the second direction Z2 through the through hole 66a.

Thus, the driving gear unit 63 composed of the worm 61 and the worm wheel 62 and the operation portion 67 can be attached in advance to the cover 66. This attachment is done during shipment, but may be done on site.

Installation of Cover 66:

As shown in FIG. 3, the inner opening 74d which opens in the first direction Z1 is formed in the depressed portion 73. As shown in FIG. 2, when inserting and assembling the driving gear unit 63 into the depressed portion 73 through the outer opening 74u, a portion of the worm wheel 62 protrudes toward the operation valve body 5 through the inner opening 74d, thus meshing the worm wheel 62 with the driven gear 51 of the operation valve body 5.

On the other hand, as shown in FIGS. 2 and 3, a bottom wall portion 75 for rotatably supporting an end portion 61d of the worm 61 in the first direction Z1 is formed integral with the gear case portion 70.

Therefore, when the cover 66 is installed on the gear case portion 70, the worm wheel 62 is meshed with the driven gear 51, and the end portion 61d of the worm 61 is rotatably supported by the bottom wall portion 75 of the first separate case 21.

In the present embodiment, the worm wheel 62 is rotatably supported by the rotation shaft 64 inserted through the bearing portion 65, and the end portion 61d of the worm 61 is rotatably supported by the bearing portion 65 of the first separate case 21. Therefore, the driving gear unit 63 (the worm 61, the worm wheel 62) is not intruded into the inside through the inner opening 74d.

On the other hand, when the driving gear unit 63 (the worm 61, the worm wheel 62) shown in FIG. 2 is taken out from the first separate case 21, the cover 66 is taken out in the second direction Z2. Since the driving gear unit 63 is attached to the cover 66, as described above, when the cover 66 is taken out from the gear case portion 70, the driving gear unit 63 is taken out from the gear case portion 70 through the outer opening 74u.

Operation Valve Body 5 and Rubber Ring 56:

The operation valve body 5 has a concave surface 53 curved along the outer periphery surface 13 of the existing pipe 1, and a convex surface 52 opposing the branch hole 28 in the valve-closed position shown in FIGS. 9A and 9B.

In the valve-closed position shown in FIG. 2, the first contact portion 5f of the convex surface 52 of the operation valve body 5 which is in contact with the second contact portion 56f of the rubber ring 56 protrudes past the surface of the driven gear 51 in the radial direction C of the existing pipe 1.

As shown in FIG. 6, in the valve-closed position (FIG. 2), the first contact portion 5f (the portion indicated by a dotted area) with which the rubber ring 56 (FIG. 5) contacts is formed in a loop shape. The driven gear 51 is formed on the operation valve body 5 in a region 5a inside the loop-shaped first contact portion 5f (the portion indicated by a dotted area).

As shown in FIG. 4, the worm wheel 62 is formed by helical teeth 62a which are formed inclined with respect to the pipe axis direction L of the existing pipe 1 (FIG. 2) so as to mesh with the worm 61 (FIG. 3). On the other hand, as shown in FIG. 6, the driven gear 51 of the operation valve body 5 is formed by helical teeth so as to mesh with the worm wheel 62 (FIG. 4).

The driven gear 51 formed on the operation valve body 5 is formed in an inclined direction. Therefore, as the driven gear 51 meshes with the worm wheel 62, a rotational force acts upon the cover 66. In order to prevent the rotation of the cover 66, it is preferred that the support portion 66b of the cover 66, etc., engage with the depressed portion 73 (FIG. 3).

For example, a tar epoxy resin, or the like, is applied on the surface of the driven gear 51, and powder coating is applied on a portion of the operation valve body 5 excluding the driven gear 51.

Flow-Undisrupted Boring Method:

First, a method for boring the opening 11 for inserting the gate valve body 90 of FIG. 10 will be described.

First, with a fluid flowing inside the existing pipe 1 of FIG. 2, the separate cases 21 and 22 are attached so as to enclose the outer periphery surface 13 of the existing pipe 1. After the attachment, the operator assembles together the separate cases 21 and 22 with the assembling bolts.

Note that the operation valve body 5 is first set to the valve-closed position where the branch hole 28 of the branch pipe portion 27 is closed. A waterproof test may be performed for checking whether there is no water leak by injecting water between the separate cases 21 and 22 in the valve-closed state and the existing pipe 1.

Then, the valve is opened as shown in FIG. 7A, and the operator further attaches a joint portion 31 of the boring machine 3 to the joint portion 81 of the branch pipe portion 27 using bolts. Thus, the present apparatus 2 airtightly encloses a portion of the existing pipe 1.

After the enclosure, as the hole saw 4 is moved in the boring direction C1 toward the existing pipe 1 while spinning the hole saw 4 as shown in FIG. 7B, the center drill 41 cuts the pipe wall 12 of the existing pipe 1, thereby positioning the hole saw 4 spinning about the center drill 41 with respect to the existing pipe 1. Then, as shown in FIG. 8A, a portion of the pipe wall 12 of the existing pipe 1 is cut off by the hole saw 4, thus forming the opening 11.

After boring by the center drill 41 and the hole saw 4, the hole saw 4 is moved in the retracting direction C2 as shown in FIG. 8B.

Then, as the operator rotates the operation portion 67, the worm wheel 62 which meshes with the worm 61 rotates, and the operation valve body 5 is guided by the guide portion 55 (FIG. 5) by means of the driven gear 51 which meshes with the worm wheel 62 so as to be rotated in the valve-closing direction R1 of the branch hole 28, thus moving the operation valve body 5 in the valve-open position to the valve-closed position shown in FIG. 9A. As the operation valve body 5 moves into the valve-closed position, the operation valve body 5 closely contacts the surface of the rubber ring 56, thus shutting the branch hole 28.

After the shutting, the boring machine 3 is taken out from the apparatus 2 as shown in FIG. 9B.

Method for Inserting and Removing Gate Valve Body 90:

Then, a joint portion 91 of the valve cover portion 92 is attached to the joint portion 81 of the first separate case 21 as shown in FIG. 10 using bolts (not shown), forming the sealing case 20. A portion of the gate valve body 90 is accommodated in the valve cover portion 92. The gate valve body 90 is accommodated by the valve cover portion 92 and the branch pipe portion 27, and is for being intruded into the opening 11 of the existing pipe 1 to stop the flow of water through the existing pipe 1.

As the operator rotates the operation portion 67 in the opposite direction, the operation valve body 5 is rotated in the valve-opening direction R2 and moved to the valve-open position shown (FIG. 7A).

Then, as is well known in the art, the gate valve body 90 is moved in the lower direction C1 to be intruded into the existing pipe 1, thereby stopping the flow of water through the existing pipe 1. Various operations are performed downstream of the portion of the existing pipe 1 where the water is stopped.

After the operations, the gate valve body 90 is moved in the upper direction C2, thereby allowing water to flow downstream along the existing pipe 1.

Then, as the operator rotates the operation portion 67, the operation valve body 5 is rotated in the valve-closing direction R1 and moved to the valve-closed position.

After the operation valve body 5 is moved to the valve-closed position, i.e., in the state of FIG. 10, the joint portion 91 and the valve cover portion 92 are taken out from the first separate case 21.

Figure 11:
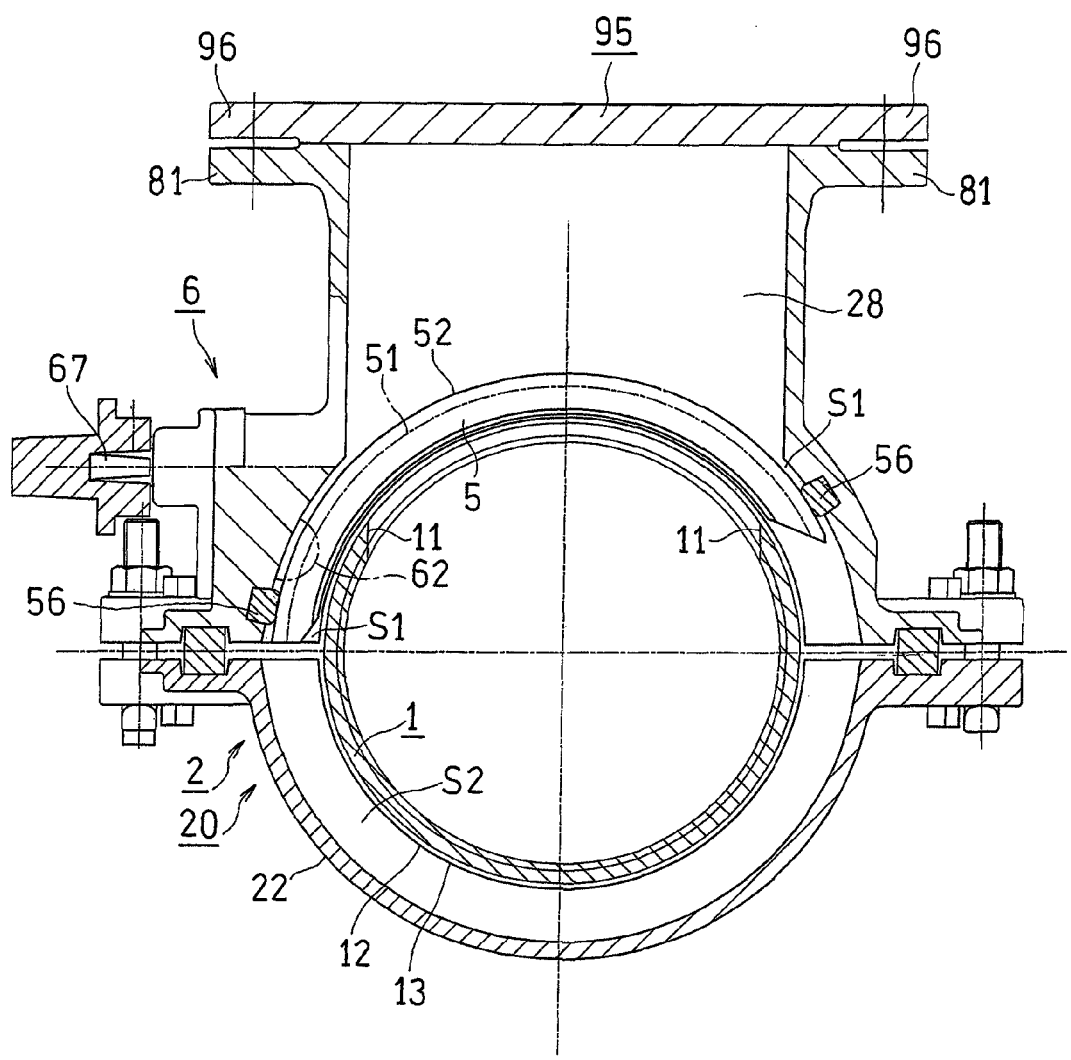
FIG. 11 is a schematic cross-sectional view showing the apparatus, etc., with the gate valve body attached thereto.

Then, as shown in FIG. 11, a joint portion 96 of the valve plate 95 is attached to the joint portion 81 of the first separate case 21 using bolts (not shown) for sealing.

Thus, the gate valve body 90 and the valve cover portion 92, which have been retrieved, can be used in other operations.

Note that if the driving gear unit 63 malfunctions, and the operation valve body 5 cannot be rotated in the valve-opening direction R2, the cover 66 can be removed and the driving gear unit 63 can be taken out.

Figure 12:
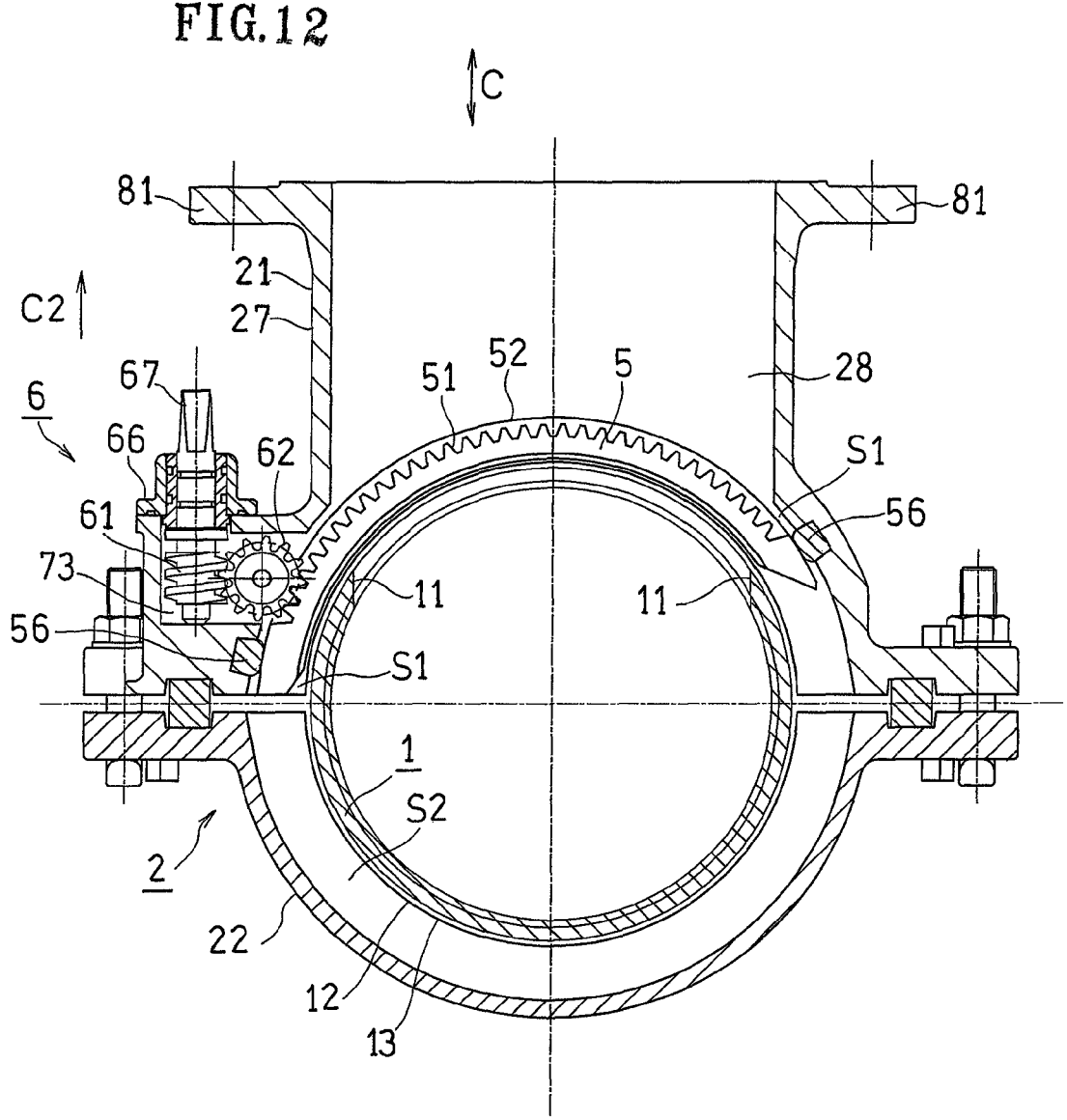
FIG. 12 is a schematic cross-sectional view showing the apparatus, illustrating a variation.
Figure 13A:
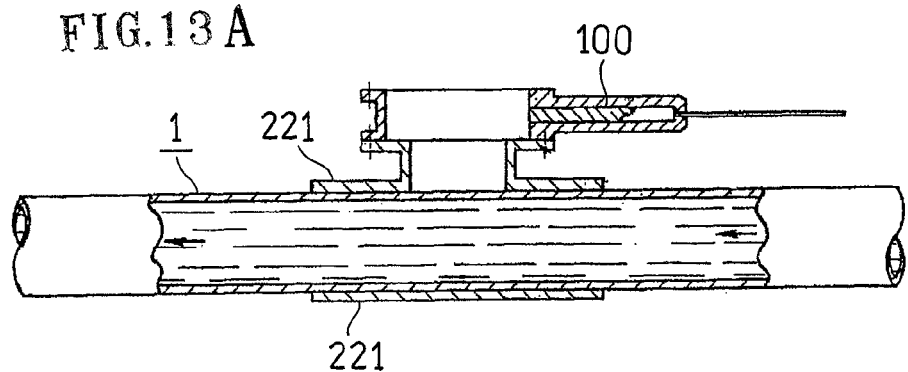
FIGS. 13A to 13D are schematic cross-sectional views of the apparatus, etc., showing a conventional flow-undisrupted boring method.
Figure 13B:
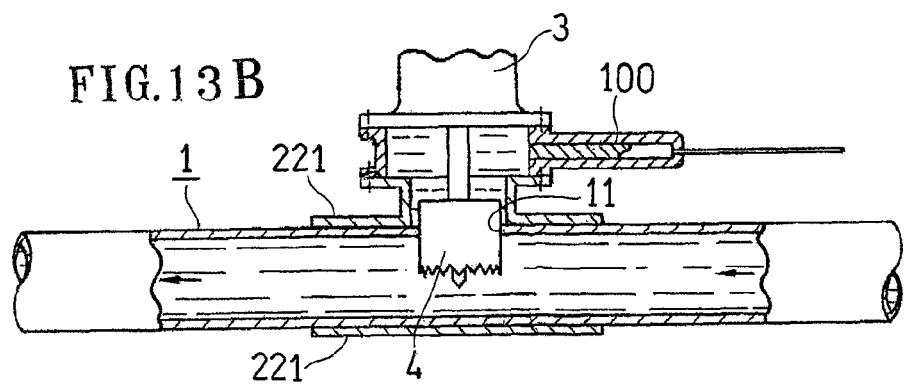
Figure 13C:
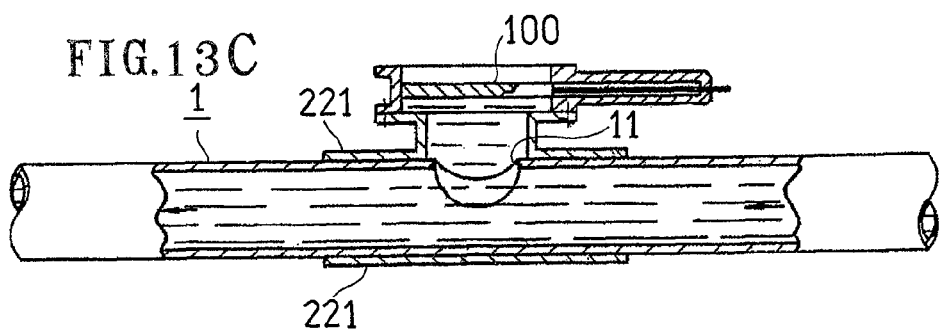
Figure 13D:
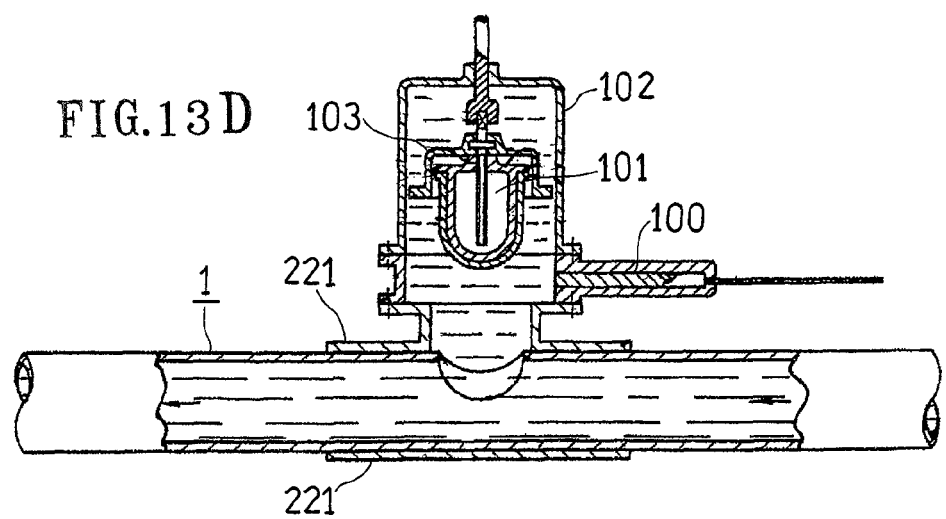
Figure 14:
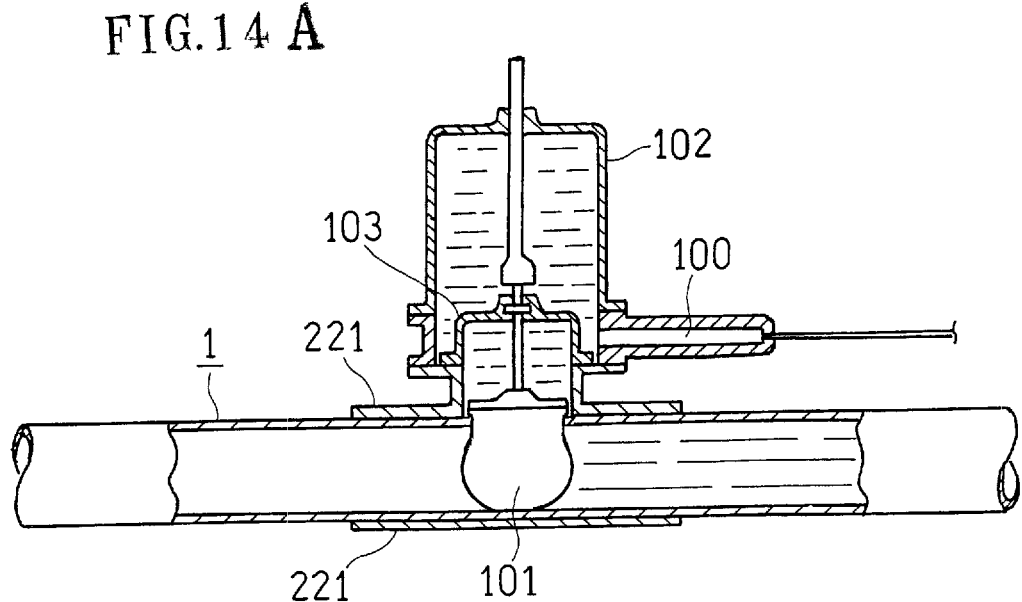
FIGS. 14A and 14B are schematic cross-sectional views of the apparatus, etc., showing the conventional flow-undisrupted boring method.
Figure 14:
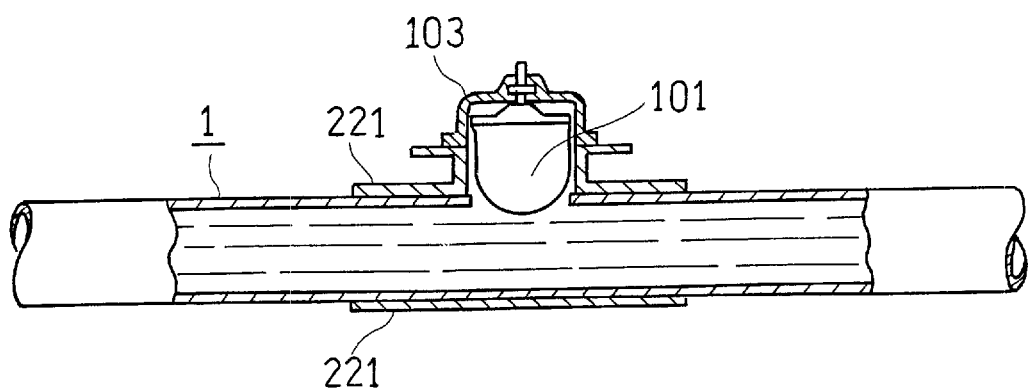

Variation:

FIG. 12 shows a variation.

In the variation shown in FIG. 12, the axis of the worm 61 of the rotation mechanism 6 is set to be in the up-down direction C. Therefore, the depressed portion 73 opens in the upper direction C2, and the opening is shut by the cover 66.

The configuration is otherwise similar to that of Embodiment 1, and like elements are denoted by like reference numerals and will not be described below.

While preferred embodiments have been described above with reference to the drawings, various obvious changes and modifications will readily occur to those skilled in the art upon reading the present specification.

While the case enclosing the existing pipe is divided into two pieces of the first and second separate cases in the embodiment described above, it may be divided into three or more pieces.

The case enclosing the existing pipe may be a cast product or may be formed by a steel plate. Where the case is formed by a steel plate, the two separate cases may be formed integral with each other by welding the first and second separate cases which are tentatively assembled together.

Moreover, it is not necessary to provide the rubber packing on the separate cases, but the rubber packing may be provided on the valve body.

The gear case portion may be provided on the side of the second separate case.

Thus, such changes and modifications are deemed to fall within the scope of the present invention, which is defined by the appended claims.

INDUSTRIAL APPLICABILITY

The apparatus for flow-undisrupted boring of the present invention can be used for inserting a gate valve body of an existing pipe of water, gas, etc., into a line of the existing pipe, and for removing the inserted gate valve body.

Reference Signs List
1: Existing pipe
2: Apparatus
3: Boring machine
5: Operation valve body
6: Rotation mechanism
20: Sealing case
21: First separate case
22: Second separate case
27: Branch pipe portion
51: Driven gear
56: Rubber ring (an example of the valve seat)
61: Worm
62: Worm wheel
63: Driving gear unit
65: Bearing portion
67: Operation portion
74$u$: Outer opening
75$d$: Inner opening
90: Gate valve body
92: Valve cover portion
R: Circumferential direction
Z1: First direction
Z2: Second direction

The invention claimed is:

1. A method suitable for boring a portion of a pipe wall of an existing pipe to form an opening in the pipe wall with a boring machine, inserting a gate valve body into a line of the existing pipe to stop a flow of a water through the existing pipe, and removing the inserted gate valve body, the method using an apparatus, the apparatus comprising:

a sealing case including first and second separate cases separated from each other in a circumferential direction of the existing pipe and enclosing a portion of the existing pipe, and a valve cover portion attached to a branch pipe portion formed integral with the first separate case and protruding upwardly in a radial direction of the existing pipe, an axis of the branch pipe portion being set to be in an up-down direction;

the gate valve body accommodated by the valve cover portion and the branch pipe portion to be intruded into the existing pipe to stop the flow of the water through the existing pipe;

an operation valve body having an arc-shaped lateral cross section for opening/closing a branch hole formed in the branch pipe portion by rotating in the circumferential direction of the existing pipe between an inner periphery surface of the sealing case and an outer periphery surface of the existing pipe;

a valve seat provided on the inner periphery surface of the first separate case with which the operation valve body contacts in a valve-closed state; and a rotation mechanism for rotating the operation valve body, the rotation mechanism comprising:

an operation portion rotated outside the sealing case;

a driving gear unit which rotates following the rotation of the operation portion; and a driven gear provided on the operation valve body for rotating the operation valve body in the circumferential direction of the existing pipe following the rotation of the driving gear unit, the method for removing the gate valve body comprising the steps of:

forming the opening by the boring machine attached to the branch pipe portion with the water flowing inside the existing pipe;

moving the operation valve body from the valve-open position to the valve-closed position and then taking out the boring machine;

attaching the valve cover portion accommodating the gate valve body to the first separate case;

rotating the operation valve body in the circumferential direction and moving the operation valve body to the valve-open position;

after moving the operation valve body to the valve-closed position, taking out the valve cover portion accommodating the gate valve body from the first separate case and removing the gate valve body;

after removing the gate valve body, attaching a tectal plate to a joint portion of the first separate case and sealing the branch hole of the first separate case.

2. A method according to claim 1, the method further comprising the step of:

moving the gate valve body in a lower direction to intrude into the existing pipe, thereby stopping the flow of the water.

3. A piping structure completed by the method for removing the gate valve body according to claim 1, wherein in the piping structure, the opening is formed in the existing pipe;

the sealing case encloses the portion of the existing pipe including the opening;

the operation valve body that has the arc-shaped lateral cross section shuts the branch hole so as to cover the opening along the circumferential direction of the existing pipe;

the tectal plate shuts the branch hole of the first separate case.

* * * * *